(12) United States Patent
Dombrowski

(10) Patent No.: US 7,695,770 B2
(45) Date of Patent: Apr. 13, 2010

(54) COATING BINDER POLYMER AND COATINGS

(75) Inventor: Gary William Dombrowski, West Chester, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/895,117

(22) Filed: Aug. 23, 2007

(65) Prior Publication Data

US 2008/0075868 A1 Mar. 27, 2008

Related U.S. Application Data

(60) Provisional application No. 60/846,255, filed on Sep. 21, 2006.

(51) Int. Cl.
*B05D 3/02* (2006.01)
(52) U.S. Cl. ............... 427/384; 427/388.4; 524/522
(58) Field of Classification Search ............... 427/384, 427/388.4; 524/522
See application file for complete search history.

(56) References Cited

U.S. PATENT DOCUMENTS

| 4,325,856 | A | 4/1982 | Ishikawa et al. |
| 4,384,056 | A | 5/1983 | Schmidt et al. |
| 4,539,361 | A | 9/1985 | Siol et al. |
| 4,654,397 | A | 3/1987 | Mueller-Mall et al. |
| 4,814,373 | A | 3/1989 | Frankel et al. |
| 5,162,415 | A | 11/1992 | Rehmer et al. |
| 5,990,228 | A * | 11/1999 | Eichman et al. ............. 524/529 |
| 6,258,887 | B1 | 7/2001 | Bardman et al. |
| 6,677,398 | B2 * | 1/2004 | Egolf et al. ................. 524/522 |
| 6,710,112 | B1 | 3/2004 | Sandor et al. |
| 2004/0054063 | A1 * | 3/2004 | Brown et al. ................ 524/500 |

FOREIGN PATENT DOCUMENTS

JP 5-179092 7/1993

OTHER PUBLICATIONS

F. Dobler, et al, "Synthesis of Model Latices for the Study of Coalescence Mechanisms", J. Applied Polymer Science, vol. 44, 1075-1086 (1992).
G.A. Vandezande, "Novel Composite Latex Particles For Use In Coatings", Journal of Coatings Technology, vol. 66, 99-108 (1994).

* cited by examiner

*Primary Examiner*—Michael Barr
*Assistant Examiner*—Robert S Walters, Jr.
(74) *Attorney, Agent, or Firm*—Ronald D Bakule

(57) ABSTRACT

A multi-stage aqueous emulsion polymer including a first polymer having a calculated Hansch parameter >2.0, the first polymer including 0.5-5 wt. % copolymerized acid monomer, based on the weight of the first polymer, and a second polymer including from zero to less that half the wt. % of acid monomer in the first polymer, based on the weight of the second polymer, the second polymer being from 50% to 85% of the total weight of the first polymer and the second polymer, wherein the difference between the calculated Tgs of the first and the second polymer is from 0° C. to less than 20° C. is provided. Also provided is an aqueous coating composition including the multi-stage emulsion polymer and a method for providing a coating.

4 Claims, No Drawings

000
COATING BINDER POLYMER AND COATINGS

CROSS REFERENCE TO RELATED PATENT APPLICATIONS

This is a non-provisional patent application of co-pending U.S. provisional patent application Ser. No. 60/846,255 filed Sep. 21, 2006.

This invention relates to a multi-stage aqueous emulsion polymer. This invention also relates to an aqueous coating composition and a method for providing a coating including a multi-stage aqueous emulsion polymer. More particularly, this invention relates to a multi-stage emulsion polymer including a first polymer having a calculated Hansch parameter >2.0, the first polymer including, as copolymerized units, 0.5-5 wt. % acid monomer, based on the weight of the first polymer, and a second polymer including, as copolymerized units, from zero to less than half the wt % of acid monomer in the first polymer, based on the weight of the second polymer, wherein the second polymer is from 50% to 85% of the total weight of the first polymer and the second polymer, and wherein the difference between the calculated Tgs of the first and the second polymer is from 0° C. to less than 20° C. The present invention serves to provide a multi-stage emulsion polymer binder suitable for use in decorative and/or protective coatings for various substrates which coatings maintain a desirable balance of coatings properties, particularly including good film formation and scrub and stain resistance, especially when relatively low levels of coalescent are employed, i.e., in low VOC coatings. It has long been known that a high level scrub resistance can be achieved by use of a hard polymer but not without jeopardizing film formation or requiring environmentally undesirable high levels of coalescing solvents.

U.S. Pat. No. 6,258,887 discloses a multi-stage aqueous emulsion-polymer suitable for use in dirt pickup resistant coatings and coatings containing the polymer are provided. The multi-stage aqueous emulsion polymer includes (i) a first polymer including at least one nonionic copolymerized monoethylenically unsaturated monomer, from 0.5% to 7% of a copolymerized monoethylenically unsaturated ionic monomer, based on the weight of the first polymer, and from 0% to 1.0%, based on the weight of the first polymer, of a copolymerized multi-ethylenically unsaturated monomer, the first polymer having a Tg of 15° C. to 105° C.; and (ii) a second polymer comprising at least one nonionic copolymerized monoethylenically unsaturated monomer, from 0% to 2% of a copolymerized monoethylenically unsaturated ionic monomer, and from 0.25% to 6%, based on the weight of the second polymer, copolymerized multi-ethylenically unsaturated monomer, the second polymer having a Tg of −55° C. to 30° C., the second polymer having a different composition than the first copolymer, and the second polymer being from 25% to 75% of the total weight of the first polymer and the second polymer, based on dry polymer weights. However, improvements in the balance of coatings properties obtainable from coatings particularly those employing low levels of coalescent are still desired. The problem faced by the inventors is the provision of an emulsion polymer suitable for use in aqueous coatings which provide dried coatings that maintain a desirable balance of coatings properties, particularly including good film formation and scrub and stain resistance, especially when relatively low levels of coalescent are employed, i.e., in low VOC coatings.

In a first aspect of the present invention there is provided a multi-stage aqueous emulsion polymer comprising a first polymer having a calculated Hansch parameter >2.0, the first polymer comprising, as copolymerized units, 0.5-5 wt. % acid monomer, based on the weight of said first polymer, and a second polymer comprising, as copolymerized units, from zero to less than half the wt. % of acid monomer in said first polymer, based on the weight of said second polymer, wherein said second polymer is from 50% to 85% of the total weight of said first polymer and said second polymer, and wherein the difference between the calculated Tgs of said first and said second polymer is from 0° C. to less than 20° C.

In a second aspect of the present invention there is provided an aqueous coating composition comprising a multi-stage aqueous emulsion polymer comprising a first polymer having a calculated Hansch parameter >2.0, said first polymer comprising, as copolymerized units, 0.5-5 wt. % acid monomer, based on the weight of said first polymer, and a second polymer comprising, as copolymerized units, from zero to less than half the wt. % of acid monomer in said first polymer, based on the weight of said second polymer, wherein said second polymer is from 50% to 85% of the total weight of said first polymer and said second polymer, and wherein the difference between the calculated Tgs of said first and said second polymer is from 0° C. to less than 20° C.

In a third aspect of the present invention there is provided a method for providing a coating comprising (a) forming an aqueous coating composition comprising a multi-stage aqueous emulsion polymer comprising a first-stage polymer having a calculated Hansch parameter >2.0, said first-stage polymer comprising, as copolymerized units, 0.5-5 wt. % acid monomer, based on the weight of said first-stage polymer, and a second-stage polymer comprising, as copolymerized units, from zero to less than half the wt. % of acid monomer in said first-stage polymer, based on the weight of said second-stage polymer, wherein said second-stage polymer is from 50% to 85% of the total weight of said first-stage polymer and said second-stage polymer, and wherein the difference between the calculated Tgs of said first-stage and said second-stage polymer is from 0° C. to less than 20° C.; (b) applying said aqueous coating composition to a substrate; and (c) drying, or allowing to dry, said applied aqueous coating composition.

The multi-stage aqueous emulsion polymer includes a first polymer having a calculated Hansch parameter >2.0, the first polymer including, as copolymerized units, 0.5-5 wt. % acid monomer, based on the weight of the first polymer. The multi-stage aqueous emulsion polymer also includes a second polymer including, as copolymerized units, from zero to less that half the wt % of acid monomer in the first polymer, based on the weight of the second polymer. Further, the second polymer is from 50% to 85% of the total weight of the first polymer and the second polymer, and the difference between the calculated Tgs of the first and the second polymer is from 0° C. to less than 20° C. By "multi-stage aqueous emulsion polymer" herein is meant an emulsion polymer prepared by the sequential addition of two or more different monomer compositions. By "first polymer" and "second polymer" herein are meant two polymers having different compositions regardless of the order in which they were prepared in a multi-stage emulsion polymerization process. By "first-stage polymer" herein is meant the emulsion polymer of the first-stage and second-stage polymers which is formed first; by "second-stage polymer" herein is meant a polymer which is formed in the presence of the first-stage polymer. However, the first-stage polymer may be formed in the presence of a previously formed dispersed polymer in an amount of 0-10%, by weight based on the weight of the first-stage polymer, sometimes known as a seed polymer, of a composition the same as or different from that of the first-stage polymer. One or more additional stages may be formed before or after the first- or second-stage polymer but they shall not constitute in totality more than 25% by weight of the total weight of the first and second stages. Neither the weight nor composition of any seed polymer or any additional stage(s) polymer shall be included in the weight, composition, calculated Hansch parameter, or calculated Tg of the first or the second polymer.

The first polymer and the second polymer each typically include at least one nonionic copolymerized ethylenically unsaturated monomer such as, for example, a (meth)acrylic ester monomer including methyl (meth)acrylate, ethyl (meth) acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth) acrylic acid; styrene or substituted styrenes; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, and N-vinyl pyrollidone; (meth)acrylonitrile; N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. In certain embodiments the first polymer or the second polymer, independently, contains less than 0.25 wt. %, or in the alternative, less than 0.1 wt. %, based on the weight of the polymer, of a copolymerized multi-ethylenically unsaturated monomer. In certain embodiments the first polymer or the second polymer, independently, is free from copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The first polymer includes from 0.5% to 5%, preferably from 1% to 4%, of a copolymerized monoethylenically-unsaturated acid monomer, based on the weight of the first polymer. The second polymer contains from 0% to half the wt % of the acid monomer in the first polymer, of a copolymerized monoethylenically-unsaturated acid monomer, based on the weight of the second polymer. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers for copolymerization into the first polymer and the second polymer are carboxylic acid monomers. Preferred is a second polymer which contains less than 25% of the wt % of copolymerized carboxylic acid monomer in the first polymer. Preferred is a second polymer which contains an amount of copolymerized acid monomer less than 0.1% by weight based on the weight of the second polymer. More preferred is a second polymer which contains no copolymerized acid monomer.

The first polymer has a calculated Hansch parameter greater than 2.0, preferably greater than 2.3. In certain embodiments the second polymer has a calculated Hansch parameter greater than 2.0, alternatively greater than that of the first polymer. The calculated Hansch parameters, which can be viewed as an index related to polymer hydrophobicity, higher values being indicative of greater hydrophobicity, as used herein, are those calculated according to the Kowwin methodology as can be found via download from the epa.gov/ website at oppt/exposure/pubs/episuitedl.htm. Values for monomer units calculated thereby used in the definition of the present invention follow.

Hansch Parameters (from EPA Kowwin Program):

| Monomer | Calculated |
|---|---|
| Acrylic acid | 0.4415 |
| Methacrylic acid | 0.9888 |
| Methyl acrylate | 0.7278 |
| Itaconic acid | −0.3434 |
| Ethyl acrylate | 1.2189 |
| Acrylamide | −0.8074 |
| Acrylonitrile | 0.2092 |
| Vinyl acetate | 0.7278 |
| Methyl methacrylate | 1.2751 |
| Hydroxyethyl Methacrylate | 0.3014 |
| Butyl acrylate | 2.2011 |
| i-Butyl Methacrylate | 2.6749 |
| Ethylhexyl acrylate | 4.5831 |
| Lauryl acrylate | 6.1299 |
| Styrene | 2.8950 |
| i-Bornyl methacrylate | 4.7589 |
| Acetoacetylethyl methacrylate | 0.2393 |
| Ureido methacrylate | 0.4090 |
| Ethyl methacrylate | 1.7662 |
| Butyl Methacrylate | 2.7488 |

Calculated Hansch parameters for polymers herein are calculated by summing the contribution from each copolymerized monomer weighted by the weight fraction of the monomer in that polymer. That is, for example, for a polymer including 45 wt % MMA and 55 wt % BMA, one would calculate the polymer Hansch parameter as 0.45(MMA Hansch)+0.55(BMA Hansch)=0.45(1.2751)+0.55(2.7488) =2.0856

The difference between the calculated glass transition temperature ("Tg") of the first and the second polymer is from 0° C. to less than 20° C.; either Tg may be higher. Tgs of the polymers are calculated herein by using the Fox equation (T. G. Fox, Bull. Am. Physics Soc., Volume 1, Issue No. 3, page 123 (1956)). that is, for calculating the Tg of a copolymer of monomers M1 and M2, $$1/Tg(calc.) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers. In certain embodiments the calculated Tg of the first polymer or the second polymer, independently, is from −25° C. to 105° C., in the alternative, from −25° C. to 35° C.

In the multi-stage emulsion polymerization process at least two stages different in composition are formed in sequential fashion. Preferred is a multi-stage emulsion polymerization process in which the first polymer is a first-stage polymer and the second polymer is a second-stage polymer, i.e., the second polymer is formed by emulsion polymerization in the presence of the first emulsion polymer. In any event the weight of the second stage polymer is from 50% to 85%, preferably from 65% to 80%, of the total weight of the first stage polymer and the second stage polymer, based on dry polymer weights. The polymerization techniques used to prepare such aqueous multi-stage emulsion-polymers are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of one or more of the polymers. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. Such particles are composed of two or more phases of various geometries such as, for example, core/shell or core/sheath particles, core/shell particles with shell phases incompletely encapsulating the core, core/shell particles with a multiplicity of cores, and interpenetrating network particles.

The average particle diameter of the emulsion-polymerized polymer particles is typically from 30 nanometers to 500 nanometers.

The aqueous coating composition is prepared by techniques which are well known in the coatings art. First, pigment(s), if desired, are well dispersed in an aqueous medium under high shear such as is afforded by a COWLES (R) mixer or predispersed colorant(s), or mixtures thereof are used. Then the multi-stage emulsion-polymer is added under low shear stirring along with other coatings adjuvants as desired. The aqueous coating composition may contain, in addition to the multi-stage emulsion polymer and optional pigment(s), film-forming or non-film-forming solution or emulsion polymers in an amount of 0% to 500% by weight of the multistage emulsion polymer, and conventional coatings adjuvants such as, for example, emulsifiers, coalescing agents, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants. In certain embodiments a photosensitive compound such as, for example, benzophenone or a substituted acetophenone or benzophenone derivative as is taught in U.S. Pat. No. 5,162,415 may be added. In certain embodiments the aqueous coating composition of the invention has a VOC (volatile organic compound) level of 150 or less g/liter of coating, alternatively of 100 g/liter or less, or further alternatively of 50 g/liter or less.

The solids content of the aqueous coating composition may be from 10% to 70% by volume. The viscosity of the aqueous coating composition may be from 50 centipoise to 50,000 centipoise, as measured using a Brookfield viscometer; viscosities appropriate for different application methods vary considerably.

The aqueous coating composition is typically applied to a substrate such as, for example, wood, metal, plastics, cementitious substrates such as, for example, concrete, stucco, and mortar, previously painted or primed surfaces, and weathered surfaces. The aqueous coating composition may be applied to a substrate using conventional coatings application methods such as, for example, curtain coater and spraying methods such as, for example, air-atomized spray, air-assisted spray, airless spray, high volume low pressure spray, and air-assisted airless spray.

Drying of the aqueous coating composition may be allowed to proceed under ambient conditions such as, for example, at 5° C. to 35° C. or the coating may be dried at elevated temperatures such as, for example, from 35° C. to 150° C.

| Abbreviations used | | Homopolymer Tg |
|---|---|---|
| Acetoacetoxyethyl methacrylate | AAEM | 7.3 |
| Allyl methacrylate | ALMA | 105 |
| Acrylonitrile | AN | 96 |
| Butyl acrylate | BA | −54 |
| Methyl methacrylate | MMA | 105 |
| Methacrylic acid | MAA | 185 |
| Surfactant A | | Alkylpolyethoxyphosphate, ammonium salt (25%) |
| Surfactant B | | Alkylpolyethoxysulfate, ammonium salt (30%) |
| tAmyl hydroperoxide (85%) | tAHP | |
| tButyl hydroperoxide (70%) | tBHP | |
| Isoascorbic acid | IAA | |
| n-Dodecanethiol | nDDM | |

EXPERIMENTAL METHODS

Preparation of Aqueous Coating Compositions and Comparative Coating Composition

Aqueous coatings compositions were prepared using predispersed titanium dioxide slurry by combining the ingredients in the following Table.

TABLE

Ingredients for Coatings Composition

| Ingredient | Amount | Source |
|---|---|---|
| Water | 207.1 g | |
| Polymer composition of Example x | 414 g | |
| Tamol TAMOL ™ 1124 dispersant | 0.78 g | Rohm and Haas Company |
| AMP-95 | 1.0 | Angus Chemical Company |
| KRONOS ™ 4311 titanium dioxide pigment | 314.99 g | Kronos Inc. |
| MINEX ™ 10 extender | 14.01 | Unimin Corporation |
| TEXANOL ™ coalescent | 6.13 g | Eastman Chemical Co. |
| ROPAQUE ULTRA ™ opaque pigment | 21.0 | Rohm and Haas Company |
| Ethylene glycol | 4.5 | Dow Chemical Company |
| ATTAGEL ™ 50 thickener | 5.0 g | Englehard Corporation |
| FOAMEX ™ 8030 defoamer | 2.0 | Tego Coatings and Inks, Inc. |
| ACRYSOL ™ RM-2020NPR rheology modifier | 42.9 g | Rohm and Haas Company |
| ACRYSOL ™ SCT-275 Rheology modifier | 6.13 g* | Rohm and Haas Company |

*Level of ACRYSOL ™ SCT-275 rheology modifier was adjusted to meet a target viscosity of 90 KU.

Other coating compositions were also prepared according to the above procedure by replacing the polymer of Example x with an equivalent quantity (based on solids) of the other polymer.

Stain Resistance Testing: ASTM D4828

A coating of composition X was drawn down using a 3-mil Bird applicator on black vinyl chart and allowed to dry for 7 days in a constant temperature and humidity room at 77° F. and 50% relative humidity. Stains were applied to the film and allowed to stand for 2 hours. In the case of solvent-based stains, a layer of stain saturated cheesecloth was applied to the film for the two hours. Excess stain was gently wiped using laboratory tissue, and then placed upon a Paul N. Gardner Company, Inc. Washability tester fitted with a sponge (total weight 1.5 kg). The sponge was saturated with a 1% solution of Tide™ (Proctor and Gamble Company) in water, and the film subjected to 100 scrub cycles. The chart was rinsed under tap water and allowed to dry overnight. The visual stain rating comparison was made the following day. The lipsticks used were from the Covergirl®line of products. The other stains were common household items either used as is (e.g. Ball point pen) or prepared according to the manufacturers directions (e.g. dark roast, drip coffee).

Scrub Resistance: ASTM D2486A

The scrub resistance was determined using the ASTM method D2486A.

Low Temperature Film Formation (LTFF): ASTM WK10135

The degree of cracking was characterized using a 10× magnifying glass according to with the following rating scale. Ratings of 8 and greater are considered acceptable low temperature film formation.

10=none

9=trace

8=trace/slight

7=slight

6=slight/moderate

5=moderate

4=moderate/heavy

3=heavy

2=heavy/very heavy

1=very heavy

The preparation of multi-stage aqueous emulsion polymers of the present invention is presented in Examples 1-16.

Example 1

Monomer emulsion 1 was prepared by mixing 154.8 g of DI water, 12.9 g of Surfactant B, 108.9 g of EHA, 96.2 g of BA, 186.5 g of MMA, 12.4 g of MAA and 3.4 g of ureido methacrylate. Monomer emulsion 2 was prepared from 533 g of DI water (DI water), 44 g of Surfactant B, 738.5 g of EHA and 668.2 g of MMA. A flask was charged with 734.5 g of DI water, 7 g of sodium acetate and 9 g of Surfactant B, and then brought to 80° C. under a nitrogen purge. The flask was charged with 114.4 g of monomer emulsion 1. To this mixture was charged 0.03 g of a mixture of ferrous sulfate heptahydrate and 0.02 g of EDTA tetrasodium salt in 22 g of DI Water, 1.3 g of tBHP in 10 g of DI Water, and 0.5 g of IAA in 10 g of DI Water. After 10 minutes, the remainder of monomer emulsion 1 was fed to the reactor over 23 minutes. A mixture of 3.7 g of tBHP and 1.3 g of Surfactant B in 144 g of DI water was simultaneously added to the reactor with a solution of 2.35 g of IAA in 144 g of DI Water during both stages of the polymerization, 110 minutes. At the completion of addition of monomer emulsion 1, monomer emulsion 2 was then fed to the reactor over 77 minutes. Fifteen minutes after the start of stage 2, 3.2 g of 28% ammonium hydroxide in 10.5 g of DI water was charged to the kettle. The emulsion polymer was charged with 6.4 g of 28% ammonium hydroxide in 20.9 g of DI water, and then 1.0 g of tBHP in 10 g of DI Water. A solution of 0.66 g of IAA in 10 g of DI Water was then fed over 15 minutes. The emulsion polymer was cooled to room temperature and then filtered to remove any coagulum.

Example 2

Example 2 was prepared exactly as was Example 1 except that monomer emulsion 1 was prepared by mixing 154.8 g of DI water, 12.9 g of Surfactant B, 108.9 g of EHA, 96.2 g of BA, 186.5 g of MMA, 12.4 g of MAA and 3.4 g of ureido methacrylate Monomer emulsion 2 was prepared from 533 g of DI water, 44 g of Surfactant B, 386.8 g of EHA, 351.6 g of BA and 668.2 g of MMA.

Example 3

Example 3 was prepared exactly as was Example 1 except that monomer emulsion 1 was prepared by mixing 154.8 g of DI water, 12.9 g of Surfactant B, 108.9 g of EHA, 96.2 g of BA, 186.5 g of MMA, 12.4 g of MAA, 3.4 g of ureido methacrylate and 1.0 g of nDDM. Monomer emulsion 2 was prepared from 533 g of DI water, 44 g of Surfactant B, 738.5 g of EHA and 668.2 g of MMA.

Example 4

Example 4 was prepared exactly as was Example 1 except that monomer emulsions was prepared by mixing 154.8 g of DI water, 12.9 g of Surfactant B, 108.9 g of EHA, 96.2 g of BA, 186.5 g of MMA, 12.4 g of MAA, 3.4 g of ureido methacrylate and 1.0 g of nDDM. Monomer emulsion 2 was prepared from 533 g of DI water, 44 g of Surfactant B, 386.8 g of EHA, 351.6 g of BA and 668.2 g of MMA.

Example 5

Monomer emulsion 1 was prepared by mixing 154.8 g of DI water, 12.9 g of Surfactant B, 104.6 g of EHA, 100.6 g of BA, 186.5 g of MMA, 7.3 g of MAA and 3.4 g of ureido methacrylate. Monomer emulsion 2 was prepared from 533 g of DI water, 44 g of Surfactant B, 386.8 g of EHA, 351.7 g of BA and 668.2 g of MMA. A flask was charged with 734.5 g of DI water, 4.2 g of sodium acetate and 9 g of Surfactant B, and then brought to 80° C. under a nitrogen purge. The flask was charged with 114.4 g of monomer emulsion 1. To this mixture was charged 0.03 g of a mixture of ferrous sulfate heptahydrate and 0.02 g of EDTA tetrasodium salt in 22 g of DI Water, 1.3 g of tBHP in 10 g of DI Water, and 0.5 g of IAA in 10 g of DI Water. After 10 minutes, the remainder of monomer emulsion 1 was fed to the reactor over 23 minutes. A mixture of 3.7 g of tBHP and 1.3 g of Surfactant B in 144 g of DI water was simultaneously added to the reactor with a solution of 2.35 g of IAA in 144 g of DI Water during both stages of the polymerization, 110 minutes. At the completion of addition of monomer emulsion 1, monomer emulsion 2 was then fed to the reactor over 77 minutes. Fifteen minutes after the start of stage 2, 3.2 g of 28% ammonium hydroxide in 10.5 g of DI water was charged to the kettle. The emulsion polymer was charged with 6.4 g of 28% ammonium hydroxide in 20.9 g of DI water, and then 1.0 g of tBHP in 10 g of DI Water. A solution of 0.66 g of IAA in 10 g of DI Water was then fed over 15 minutes. The emulsion polymer was cooled to room temperature, 39 g of Surfactant A were added, and then filtered to remove any coagulum.

Example 6

Example 6 was prepared exactly as was Example 5 except that monomer emulsion 1 was prepared by mixing 154.8 g of DI water, 12.9 g of Surfactant B, 104.6 g of EHA, 100.6 g of BA, 186.5 g of MMA, 7.3 g of MAA and 3.4 g of ureido methacrylate Monomer emulsion 2 was prepared from 533 g of DI water, 44 g of Surfactant B, 738.5 g of EHA and 668.2 g of MMA.

Comparative Example A

Monomer emulsion 1 was prepared by mixing 153.4 g of DI water, 29 g of Surfactant A, 237.1 g of BA, 167.8 g of MMA, 34.9 g of AN, 12.6 g of MAA and 12.7 g of ureido methacrylate. Monomer emulsion 2 was prepared from 504.8 g of DI water, 87 g of Surfactant A, 350.5 g of EHA, 350.5 g of BA and 701 g of MMA. A flask was charged with 821.5 g of DI water and 20 g of Surfactant B and 3.5 g of sodium carbonate and then brought to 80° C. under a nitrogen purge. The flask was charged with 114.4 g of monomer mixture 1. To this mixture was charged 0.03 g of a mixture of ferrous sulfate heptahydrate and 0.02 g of EDTA tetrasodium salt in 22 g of DI Water, 1.3 g of tAHP in 10 g of DI Water, 0.40 g of lykopon in 1 mL of DI Water and 0.5 g of IAA in 10 g of DI Water. After 10 minutes, the remainder of monomer emulsion 1 was fed to the reactor over 25 minutes. A mixture of 3.2 g of tAHP and 144 g of DI water was simultaneously added to the reactor with a solution of 2.7 g of IAA in 144 g of DI Water during both stages of the polymerization, 110 minutes. At the completion of addition of monomer emulsion 1, monomer emulsion 2 was then fed to the reactor over 77 minutes. Fifteen minutes after the start of stage 2, 3.2 g of 28% ammonium hydroxide in 10.5 g of DI water was charged to the kettle. The emulsion polymer was charged with 1.0 g of tBHP in 10 g of DI Water. A solution of 0.66 g of IAA in 10 g of DI Water was then fed over 15 minutes. The emulsion polymer was cooled to room temperature and 6.4 g of 28% ammonium hydroxide in 20.9 g of DI water were charged, and then filtered to remove any coagulum.

Example 7

Monomer emulsion 1 was prepared by mixing 153 g of DI water, 22 g of Surfactant A, 194.2 g of EHA, 211.4 g of MMA, 14.5 g of MMA and 46.7 g of AAEM. Monomer emulsion 2 was prepared from 440.8 g of DI water, 59 g of Surfactant A, 592.3 g of BA, 140 g of EHA and 667.9 g of MMA. A flask was charged with 740 g of DI water and 35 g of Surfactant A and 3.2 g of sodium carbonate and then brought to 80° C. under a nitrogen purge. The flask was charged with 114.4 g of monomer emulsion 1. To this mixture was charged 0.02 g of a mixture of ferrous sulfate heptahydrate and 0.02 g of EDTA tetrasodium salt in 22 g of DI Water, 1.0 g of tAHP in 10 g of DI Water, and 0.5 g of IAA in 10 g of DI Water. After 10 minutes, the remainder of monomer emulsion 1 was fed to the reactor over 25 minutes. A mixture of 2.95 g of tAHP, 1.3 g of Surfactant B and 144 g of DI water was simultaneously added to the reactor with a solution of 2.7 g of IAA in 144 g of DI Water during both stages of the polymerization, 100 minutes. At the completion of addition of monomer emulsion 1, monomer emulsion 2 was then fed to the reactor over 75 minutes. Fifteen minutes after the start of stage 2, 3.2 g of 28% ammonium hydroxide in 10.5 g of DI water was charged to the kettle and 3.2 g of ammonium hydroxide added to the cofeed IAA solution. The emulsion polymer was charged with 1.0 g of tAHP in 10 g of DI Water. A solution of 0.66 g of IAA in 10 g of DI Water was then fed over 15 minutes. The emulsion polymer was cooled to room temperature, and 14.5 g of 28% ammonium hydroxide was charged, and then filtered to remove any coagulum.

Comparative Example B

Comparative Example B was prepared exactly as Example 7 except that monomer emulsion 1 was prepared by mixing 153 g of DI water, 22 g of Surfactant A, 221.7 g of BA, 183.9 g of MMA, 14.5 g of MMA and 46.7 g of AAEM. Monomer emulsion 2 was prepared from 440.8 g of DI water, 59 g of Surfactant A, 350.6 g of BA, 350.6 g of EHA and 700.1 g of MMA. After the emulsion polymer was cooled to room temperature, 16 g of 28% ammonium hydroxide was charged, and then filtered to remove any coagulum.

Example 8

Monomer emulsion 1 was prepared by mixing 153 g of DI water, 22 g of Surfactant A, 194.2 g of EHA, 207.2 g of MMA, 18.7 g of p-styrene sulfonic acid, sodium salt and 46.7 g of AAEM. Monomer emulsion 2 was prepared from 440.8 g of DI water, 59 g of Surfactant A, 754.7 g of BA and 645.5 g of MMA. A flask was charged with 740 g of DI water and 35 g of Surfactant A and 3.2 g of sodium carbonate and then brought to 80° C. under a nitrogen purge. The flask was charged with 114.4 g of monomer emulsion 1. To this mixture was charged 0.03 g of a mixture of ferrous sulfate heptahydrate and 0.02 g of EDTA tetrasodium salt in 22 g of DI Water, 1.3 g of tBHP in 10 g of DI Water, and 0.5 g of IAA in 10 g of DI Water. After 10 minutes, the remainder of monomer emulsion 1 was fed to the reactor over 25 minutes. A mixture of 2.95 g of tBHP and 144 g of DI water was simultaneously added to the reactor with a solution of 2.7 g of IAA in 144 g of DI Water during both stages of the polymerization, 100 minutes. At the completion of addition of monomer emulsion 1, monomer emulsion 2 was then fed to the reactor over 75 minutes. Fifteen minutes after the start of stage 2, 3.2 g of 28% ammonium hydroxide in 10.5 g of DI water was charged to the kettle and 3.2 g of ammonium hydroxide added to the cofeed IAA solution. The emulsion polymer was charged with 1.0 g of tBHP in 10 g of DI Water. A solution of 0.66 g of IAA in 10 g of DI Water was then fed over 15 minutes. The emulsion polymer was cooled to room temperature, and 10.3 g of 28% ammonium hydroxide was charged, and then filtered to remove any coagulum

Example 9

Monomer emulsion 1 was prepared by mixing 168 g of DI water, 24.2 g of Surfactant A, 213.2 g of EHA, 232.1 g of MMA, 37.4 g of HEMA, 15.9 g of MAA and 13.9 g of ureido methacrylate. Monomer emulsion 2 was prepared from 484 g of DI water, 64.8 g of Surfactant A, 828.5 g of BA and 631.8 g of MMA. A flask was charged with 773 g of DI water, 38.4 g of Surfactant A and 3.5 g of sodium carbonate and then brought to 80° C. under a nitrogen purge. The flask was charged with 125.3 g of monomer emulsion 1. To this mixture was charged 0.03 g of a mixture of ferrous sulfate heptahydrate and 0.02 g of EDTA tetrasodium salt in 22 g of DI Water, 1.8 g of NaPS in 10 g of DI Water, and 0.6 g of IAA in 10 g of DI Water. After 10 minutes, the remainder of monomer emulsion 1 was fed to the reactor over 25 minutes. A solution of 1.2 g of NaPS in 42 g of DI water was fed to the reactor during stage 1, a solution of 2.2 g of tBHP, 1.3 g of Surfactant A and 126 g of DI water were charged during stage 2, the rates of addition being equal in the two stages. A solution of 3 g of IAA in 158 g of DI Water was added during both stages of the polymerization, 100 minutes. At the completion of addition of monomer emulsion 1, monomer emulsion 2 was then fed to the reactor over 75 minutes. Fifteen minutes after the start of stage 2, 3.5 g of 28% ammonium hydroxide in 10 g of DI water was charged to the kettle and 3.5 g of ammonium hydroxide added to the cofeed IAA solution. The emulsion polymer was charged with 1.0 g of tBHP in 10 g of DI Water. A solution of 0.7 g of IAA in 10 g of DI Water was then fed over 15 minutes. The emulsion polymer was cooled to room temperature, and 15.5 g of 28% ammonium hydroxide was charged, and then filtered to remove any coagulum.

Example 10

Monomer emulsion 1 was prepared by mixing 153 g of DI water, 22 g of Surfactant A, 194.2 g of EHA, 221.2 g of MMA and 46.7 g of AAEM. Monomer emulsion 2 was prepared from 440.8 g of DI water, 59 g of Surfactant A, 754.7 g of BA and 645.5 g of MMA. A flask was charged with 740 g of DI water and 35 g of Surfactant A and 3.2 g of sodium carbonate and then brought to 80° C. under a nitrogen purge. The flask was charged with 114.4 g of monomer emulsion 1. To this mixture was charged 0.02 g of a mixture of ferrous sulfate heptahydrate and 0.02 g of EDTA tetrasodium salt in 22 g of DI Water, 1.0 g of tAHP in 10 g of DI Water, and 0.5 g of IAA in 10 g of DI Water. After 10 minutes, the remainder of monomer emulsion 1 was fed to the reactor over 25 minutes. A mixture of 2.95 g of tAHP, 1.3 g of Surfactant B and 144 g of DI water was simultaneously added to the reactor with a solution of 2.7 g of IAA in 144 g of DI Water during both stages of the polymerization, 100 minutes. At the completion of addition of monomer emulsion 1, monomer emulsion 2 was then fed to the reactor over 75 minutes. Fifteen minutes after the start of stage 2, 3.2 g of 28% ammonium hydroxide in 10.5 g of DI water was charged to the kettle and 3.2 g of ammonium hydroxide added to the cofeed IAA solution. The emulsion polymer was charged with 1.0 g of tAHP in 10 g of DI Water. A solution of 0.66 g of IAA in 10 g of DI Water was then fed over 15 minutes. The emulsion polymer was cooled to room temperature, and 14.1 g of 28% ammonium hydroxide was charged, and then filtered to remove any coagulum

Example 11

Monomer emulsion 1 was prepared by mixing 168 g of DI water, 24.2 g of Surfactant A, 213.2 g of EHA, 232.1 g of MMA, 15.9 g of MAA and 51.2 g of AAEM. Monomer emulsion 2 was prepared from 484 g of DI water, 64.8 g of Surfactant A, 828.5 g of BA, 23.1 g of MAA and 661 g of MMA. A flask was charged with 773 g of DI water and 38.4 g of Surfactant A and 3.5 g of sodium carbonate and then brought to 80° C. under a nitrogen purge. The flask was charged with 125.3 g of monomer emulsion 1. To this mixture was charged 0.02 g of a mixture of ferrous sulfate heptahydrate and 0.02 g of EDTA tetrasodium salt in 22 g of DI Water, 1.0 g of tAHP in 10 g of DI Water, and 0.5 g of IAA in 10 g of DI Water. After 10 minutes, the remainder of monomer emulsion 1 was fed to the reactor over 25 minutes. A mixture of 3.25 g of tAHP, 1.5 g of Surfactant A and 158 g of DI water was simultaneously added to the reactor with a solution of 3.0 g of IAA in 158 g of DI Water during both stages of the polymerization, 100 minutes. At the completion of addition of monomer emulsion 1, monomer emulsion 2 was then fed to the reactor over 75 minutes. The emulsion polymer was charged with 1.0 g of tAHP in 10 g of DI Water. A solution of 0.7 g of IAA in 18 g of DI Water was then fed over 15 minutes. The solution was cooled to room temperature, and 34.4 g of 28% ammonium hydroxide was charged, and then filtered to remove any coagulum.

Comparative Example C

Comparative Example C was prepared exactly as Example 11 except that monomer emulsion 1 was prepared by mixing 168 g of DI water, 24.2 g of Surfactant A, 213.2 g of EHA, 232.1 g of MMA, 15.9 g of MAA and 51.2 g of AAEM. Monomer emulsion 2 was prepared from 484 g of DI water, 64.8 g of Surfactant A, 828.5 g of BA, 47.7 g of MAA and 685.6 g of MMA. After the emulsion polymer was cooled to room temperature, 41.2 g of 28% ammonium hydroxide was charged, and then filtered to remove any coagulum.

Example 12

Example 12 was prepared exactly as Example 11 except that monomer emulsion 1 was prepared by mixing 168 g of DI water, 24.2 g of Surfactant A, 213.2 g of EHA, 232.1 g of MMA, 15.9 g of MAA and 51.2 g of AAEM. Monomer emulsion 2 was prepared from 484 g of DI water, 64.8 g of Surfactant A, 828.5 g of BA, 12.3 g of MAA and 696.3 g of MMA. After the emulsion polymer was cooled to room temperature, 31.5 g of 28% ammonium hydroxide was charged, and then filtered to remove any coagulum.

Example 13

Monomer emulsion 1 was prepared by mixing 158 g of DI water, 24.2 g of Surfactant A, 213.2 g of EHA, 232.1 g of MMA, 15.9 g of MAA and 51.2 g of AAEM. Monomer emulsion 2 was prepared from 454 g of DI water, 64.8 g of Surfactant A, 905.4 g of BA and 631.8 g of MMA. A flask was charged with 773 g of DI water, 38.4 g of Surfactant A and 3.5 g of sodium carbonate and then brought to 80° C. under a nitrogen purge. The flask was charged with 125.3 g of monomer emulsion 1. To this mixture was charged 0.02 g of a mixture of ferrous sulfate heptahydrate and 0.02 g of EDTA tetrasodium salt in 22 g of DI Water, 1.8 g of NaPS in 10 g of DI Water, and 0.6 g of IAA in 10 g of DI Water. After 10 minutes, the remainder of monomer emulsion 1 was fed to the reactor over 25 minutes. A solution of 1.2 g of NaPS in 42 g of DI water was fed to the reactor during stage 1. A solution of 2.2 g of tAHP, 1.3 g of Surfactant A and 116 g of DI water were charged during stage 2, the rates of addition being equal in the two stages. A solution of 3 g of IAA in 158 g of DI Water was added during both stages of the polymerization, 100 minutes. At the completion of addition of monomer emulsion 1, monomer emulsion 2 was then fed to the reactor over 75 minutes. Fifteen minutes after the start of stage 2, 7 g of 28% ammonium hydroxide in 10 g of DI water was charged to the kettle and 7 g of ammonium hydroxide added to the cofeed IAA solution. The emulsion polymer was charged with 1.0 g of tAHP in 10 g of DI Water. A solution of 0.7 g of IAA in 10 g of DI Water was then fed over 15 minutes. The emulsion polymer was cooled to room temperature, and 8.5 g of 28% ammonium hydroxide was charged, and then filtered to remove any coagulum.

Example 14

Example 14 was prepared exactly as Example 13 except that monomer emulsion 1 was prepared by mixing 158 g of DI water, 24.2 g of Surfactant A, 213.2 g of EHA, 232.1 g of MMA, 15.9 g of MAA and 51.2 g of AAEM and monomer emulsion 2 was prepared from 454 g of DI water, 64.8 g of Surfactant A, 982.2 g of BA and 554.9 g of MMA.

Example 15

Example 15 was prepared exactly as Example 13 except that monomer emulsion 1 was prepared by mixing 158 g of DI water, 24.2 g of Surfactant A, 213.2 g of EHA, 232.1 g of MMA, 15.9 g of MAA and 51.2 g of AAEM and monomer emulsion 2 was prepared from 454 g of DI water, 64.8 g of Surfactant A, 1059.1 g of BA and 478 g of MMA.

Example 16

Monomer emulsion 1 was prepared by mixing 168 g of DI water, 3.1 g of Trem-LF (Cognis Corporation), 213.2 g of EHA, 230.1 g of MMA, 17.9 g of MAA and 51.2 g of AAEM. Monomer emulsion 2 was prepared from 484 g of DI water, 64.8 g of Surfactant A, 828.5 g of BA, 12.3 g of MAA and 696.3 g of MMA. A flask was charged with 773 g of DI water and 15.5 g of Trem-LF and 3.5 g of sodium carbonate and then brought to 80° C. under a nitrogen purge. The flask was charged with 125.3 g of monomer emulsion 1. To this mixture was charged 0.03 g of a mixture of ferrous sulfate heptahydrate and 0.02 g of EDTA tetrasodium salt in 22 g of DI Water, 1.0 g of tAHP in 10 g of DI Water, and 0.6 g of IAA in 10 g of DI Water. After 10 minutes, the remainder of monomer emulsion 1 was fed to the reactor over 25 minutes. A mixture of 3.25 g of tAHP, 1.1 g of Trem-LF and 158 g of DI water was simultaneously added to the reactor with a solution of 3.0 g of IAA in 158 g of DI Water during both stages of the polymerization, 100 minutes. At the completion of addition of monomer emulsion 1, monomer emulsion 2 was then fed to the reactor over 75 minutes. Fifteen minutes after the start of stage 2, 3.5 g of 28% ammonium hydroxide in 10 g of DI water was charged to the kettle and 3.5 g of ammonium hydroxide added to the cofeed IAA solution. The emulsion polymer was charged with 1.0 g of tAHP in 10 g of DI Water. A solution of 0.7 g of IAA in 18 g of DI Water was then fed over 15 minutes. The emulsion polymer was cooled to room temperature, and 15.5 g of 28% ammonium hydroxide was charged, and then filtered to remove any coagulum.

TABLE A

Calculated Tg and Hansch Parameters for Examples 1-16 and Comparative Examples A-C

| Example No. | Calculated Tg (° C.) | | Calculated Hansch parameter | |
|---|---|---|---|---|
| | First Polymer | Second Polymer | First Polymer | Second Polymer |
| 1 | −9.9 | −26 | 2.36 | 3.01 |
| 2 | −9.9 | −14 | 2.36 | 2.42 |
| 3 | −9.9 | −26 | 2.36 | 3.01 |
| 4 | −9.9 | −26 | 2.36 | 2.42 |
| 5 | −10.7 | −26 | 2.35 | 2.42 |
| 6 | −10.7 | 0.7 | 2.35 | 1.76 |
| Comp. A | 3.4 | −9.4 | 1.64 | 2.33 |
| 7 | −11.4 | −4.6 | 2.54 | 2.00 |
| Comp. B | 3.1 | −9.4 | 1.6 | 2.33 |
| 8 | −12.5 | −1.3 | 2.51 | 1.77 |
| 9 | −8 | −1.3 | 2.72 | 1.77 |
| 10 | −9.3 | −1.3 | 2.54 | 1.77 |
| Comp. C | −9.3 | −0.2 | 2.54 | 1.77 |
| 11 | −9.3 | −0.8 | 2.54 | 1.77 |
| 12 | −9.3 | −1 | 2.54 | 1.77 |
| 13 | −9.3 | −8.8 | 2.54 | 1.82 |
| 14 | −9.3 | −14.8 | 2.54 | 1.87 |
| 15 | −9.3 | −21 | 2.54 | 1.91 |
| 16 | −11.3 | −1.3 | 2.54 | 2.6 |

Example 17

Evaluation of Coatings Incorporating Multi-Stage Aqueous Emulsion Polymers

TABLE 17.1

Evaluation of aqueous coating compositions

| | Emulsion Polymer of: | | | | | |
|---|---|---|---|---|---|---|
| | Control A | Control B | Ex. 1 | Ex. 2 | Ex. 3 | Ex. 4 |
| VOC (g/L) | 150 | 61 | 45 | 49 | 50 | 49 |
| Scrub Resistance (# cycles to cut through film) | | | | | | |
| # Cycles | 1289 | 617 | 874 | 697 | 720 | 838 |
| Household Stains (removed vs. Control B removed) (3) much better, (2) better, (1) slightly better, (0) equal, (−1) slightly worse, (−2) worse, (−3) much worse than Control B. | | | | | | |
| Highlighter (pink) | −2 | | 0 | 0 | 0 | 0 |
| Ball Point Pen (Black) | 0 | | 0 | 0 | 0 | 0 |
| China Marker (red) | 0 | | 0 | 0 | 0 | 0 |
| Crayon (purple) | 2 | | 0 | 0 | 0 | 0 |

TABLE 17.1-continued

Evaluation of aqueous coating compositions

Emulsion Polymer of:

| | Control A | Control B | Ex. 1 | Ex. 2 | Ex. 3 | Ex. 4 |
|---|---|---|---|---|---|---|
| Lipstick (toasted almond) | −1 | | −2 | −1 | −3 | −1 |
| Pencil (#2) | 2 | | 0 | 0 | 0 | 0 |
| Red Sharpie | 0 | | 0 | 0 | 0 | 0 |
| H2O soluble marker | 0 | | 0 | 0 | 0 | 0 |
| Mustard, yellow | −2 | | −2 | −2 | −2 | −2 |
| Coffee, dark roast drip | −3 | | −2 | −2 | −2 | −2 |
| Tea | −3 | | −1 | −2 | −2 | −2 |
| Grape Juice | −3 | | −1 | −1 | −1 | −1 |
| LTFF (40° F./40% RH) | | few pinholes | bubbles | bubbles | bubbles | bubbles |
| rating | 10/10/10/10 | 10/10/10/10 | 10/10/10/10 | 10/10/10/10 | 10/10/10/10 | 10/10/10/10 |

TABLE 17.2

Evaluation of aqueous coating compositions

Emulsion Polymer of:

| | Control A | Control B | Ex. 5 | Ex. 6 |
|---|---|---|---|---|
| VOC (g/L) | 150 | 61 | 43 | 43 |
| Scrub Resistance (# cycles to cut through film) | | | | |
| # Cycles | 1174 | 464 | 1673 | 1182 |

Household Stains (removed vs. Control B removed)
(3) much better, (2) better, (1) slightly better, (0) equal, (−1) slightly worse, (−2) worse, (−3) much worse than Control B.

| | | | | |
|---|---|---|---|---|
| Highlighter (pink) | −2 | | 0 | 0 |
| Ball Point Pen (Black) | 0 | | 0 | 0 |
| China Marker (red) | 0 | | 0 | 0 |
| Crayon (purple) | 2 | | 0 | 0 |
| Lipstick (toasted almond) | −1 | | −2 | −1 |
| Pencil (#2) | 2 | | 0 | 0 |
| Red Sharpie | 0 | | 0 | 0 |
| H2O soluble marker | 0 | | 0 | 0 |
| Mustard, yellow | −2 | | −2 | −2 |
| Coffee dark roast drip | −3 | | −2 | −2 |
| Tea | −3 | | −2 | −2 |
| Grape Juice | −3 | | −1 | −1 |
| LTFF (40° F./40% RH) Rating | | | sl. Tack 10/10/10/10 | 10/10/10/10 |

TABLE 17.3

Evaluation of aqueous coating compositions

Emulsion Polymer of:

| | Control A | Control B | Ex. 7 | Comp. B |
|---|---|---|---|---|
| VOC (g/L) | 150 | 61 | <50 | <50 |
| Scrub Resistance (# cycles to cut through film) | | | | |
| # Cycles | 1125 | NA | 1026 | 1017 |

4 DAY dry Household Stains (removed vs. Control B removed)
(3) much better, (2) better, (1) slightly better, (0) equal,
(−1) slightly worse, (−2) worse, (−3) much worse than Control B.

| | | | | |
|---|---|---|---|---|
| ratings vs. Control B | 3 | | 2 | −3 |

TABLE 17.3-continued

Evaluation of aqueous coating compositions

Emulsion Polymer of:

| | Control A | Control B | Ex. 7 | Comp. B |
|---|---|---|---|---|
| Blue highlighter | 0 | | 0 | 0 |
| Ball Point Pen (black) | −2 | | 0 | 0 |
| black china marker | 1 | | 0 | 0 |
| purple crayon | 3 | | 0 | 0 |
| Really Red lipstick | −3 | | −1 | −3 |
| pencil (#2) | 2 | | −1 | −1 |
| H2O soluble marker | −1 | | 0 | 0 |
| Mustard, yellow | −3 | | −2 | −2 |
| Coffee, dark roast drip | −3 | | −1 | −2 |
| Tea | −3 | | −1 | −1 |
| grape juice | −3 | | −1 | −1 |
| LTFF (40° F./40% RH) | | | | |
| ASTM Rating | 10/10/10/10 | 10/10/10/10 | 10/10/10/10 | 10/10/10/10 |

TABLE 17.4

Evaluation of aqueous coating compositions

Emulsion Polymer of:

| | Control A | Ex. 10 | Comp. C | Ex. 11 | EX. 12 |
|---|---|---|---|---|---|
| VOC (g/L) | 150 | <50 | <50 | <50 | <50 |
| Scrub Resistance (# cycles to cut through film) | | | | | |
| # Cycles | 1145 | 981 | 375 | 510 | 900 |

4 DAY dry Household Stains
(3) much better, (2) better, (1) slightly better, (0) equal,
(−1) slightly worse, (−2) worse, (−3) much worse than Control B.
Ratings vs. Ex. 10

| | | | | | |
|---|---|---|---|---|---|
| Blue highlighter | 0 | | 0 | 0 | 0 |
| Ball Point Pen (black) | −1 | | 0 | 0 | 0 |
| black china marker | 0 | | 0 | 0 | 0 |
| purple crayon | 2 | | 0 | 0 | 0 |
| Really Red lipstick | −2 | | 1 | −2 | −2 |
| pencil (#2) | 1 | | 1 | 0 | 0 |
| H2O soluble marker | 0 | | 0 | 0 | 0 |
| Mustard, yellow | −1 | | 1 | 0 | 0 |
| Coffee, dark roast drip | −2 | | 1 | 0 | 0 |
| Tea | −3 | | 1 | 0 | 0 |
| Grape juice | −2 | | 1 | 0 | 0 |
| LTFF (40° F./40% RH) | | | | | |
| ASTM Rating | | 10/10/10/10 | 8/4/6/5 | 10/10/10/10 | 10/10/10/10 |

TABLE 17.5

Evaluation of aqueous coating compositions

Emulsion Polymer of:

|  | Control A | Control B | Ex. 13 | Ex. 14 | Ex. 15 |
|---|---|---|---|---|---|
| VOC (g/L)—PCFX |  |  | <50 | <50 | <50 |
| Scrub Resistance (# cycles to cut through film) | | | | | |
| # Cycles | 1087 |  | 658 | 810 | |
| 4 DAY dry Household Stains (removed) (3) much better, (2) better, (1) slightly better, (0) equal, (−1) slightly worse, (−2) worse, (−3) much worse than Control B. Ratings vs. Control B | | | | | |
| Blue highlighter |  | 0 |  | 0 | 0 |
| Ball Point Pen (black) |  | −1 |  | 0 | 0 |
| black china marker |  | 0 |  | 0 | 0 |
| Purple crayon |  | 1 |  | 0 | 1 |
| Really Red lipstick |  | −1 |  | −1 | −1 |
| pencil (#2) |  | 1 |  | 0 | 0 |
| H2O soluble marker |  | 0 |  | 0 | 0 |
| Mustard, yellow |  | −1 |  | −1 | −1 |
| Coffee, dark roast drip |  | −1 |  | −1 | −1 |
| Tea |  | −2 |  | −1 | −1 |
| grape juice |  | −2 |  | 0 | −1 |
| LTFF (40° F./ 40% RH) ASTM Rating |  |  | 10/10/10/ 10 | 10/10/10/ 10 | 10/10/10/ 10 |

Aqueous coating compositions of the present invention incorporating the multi-stage aqueous emulsion polymers of Examples 1-7 and 10-15 of the present invention form dry coatings having useful levels of scrub resistance and stain resistance at low VOC levels of about 50 g/l in their corresponding aqueous coating compositions, a superior balance of properties relative to Comparative Examples B-C and to the single stage control emulsion polymers

What is claimed is:

1. A multi-stage aqueous emulsion polymer comprising
a first polymer having a calculated Hansch parameter >2.0, the first polymer comprising, as copolymerized units, 0.5-5 wt. % acid monomer, based on the weight of said first polymer, and
a second polymer comprising, as copolymerized units, from zero to less than half the wt. % of acid monomer in said first polymer, based on the weight of said second polymer,
wherein said first polymer and said second polymer, independently, comprise less than 0.1 wt. %, based on the weight of said polymer, of a copolymerized multi-ethylenically unsaturated monomer, wherein said second polymer is from 50% to 85% of the total weight of said first polymer and said second polymer, and wherein the difference between the calculated Tgs of said first and said second polymer is from 0° C. to less than 10° C.

2. The aqueous emulsion polymer of claim 1, wherein said first polymer has a calculated Hansch parameter >2.3.

3. A method for providing a coating comprising
(a) forming an aqueous coating composition comprising a multi-stage aqueous emulsion polymer comprising
a first-stage polymer having a calculated Hansch parameter >2.0, the first polymer comprising, as copolymerized units, 0.5-5 wt. % acid monomer, based on the weight of said first polymer, and
a second-stage polymer comprising, as copolymerized units, from zero to less than half the amount of acid monomer in said first-stage polymer,
wherein said first polymer and said second polymer, independently, comprise less than 0.1 wt. %, based on the weight of said polymer, of a copolymerized multi-ethylenically unsaturated monomer, wherein said second-stage polymer is from 50% to 85% of the total weight of said first-stage polymer and said second-stage polymer, and wherein the difference between the calculated Tgs of said first-stage and said second-stage polymer is from 0° C. to less than 10° C.;
(b) applying said aqueous coating composition to a substrate; and
(c) drying, or allowing to dry, said applied aqueous coating composition.

4. The method of claim 3 wherein said first-stage polymer has a calculated Hansch parameter >2.3.

* * * * *